July 14, 1970     E. W. CAUFFMAN     3,520,397
PARTICULATE MATERIAL DISTRIBUTING DEVICE
Filed April 15, 1968     3 Sheets-Sheet 1
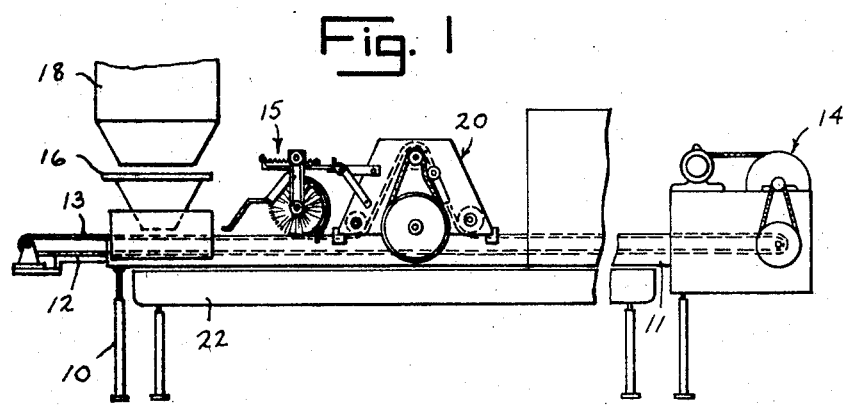
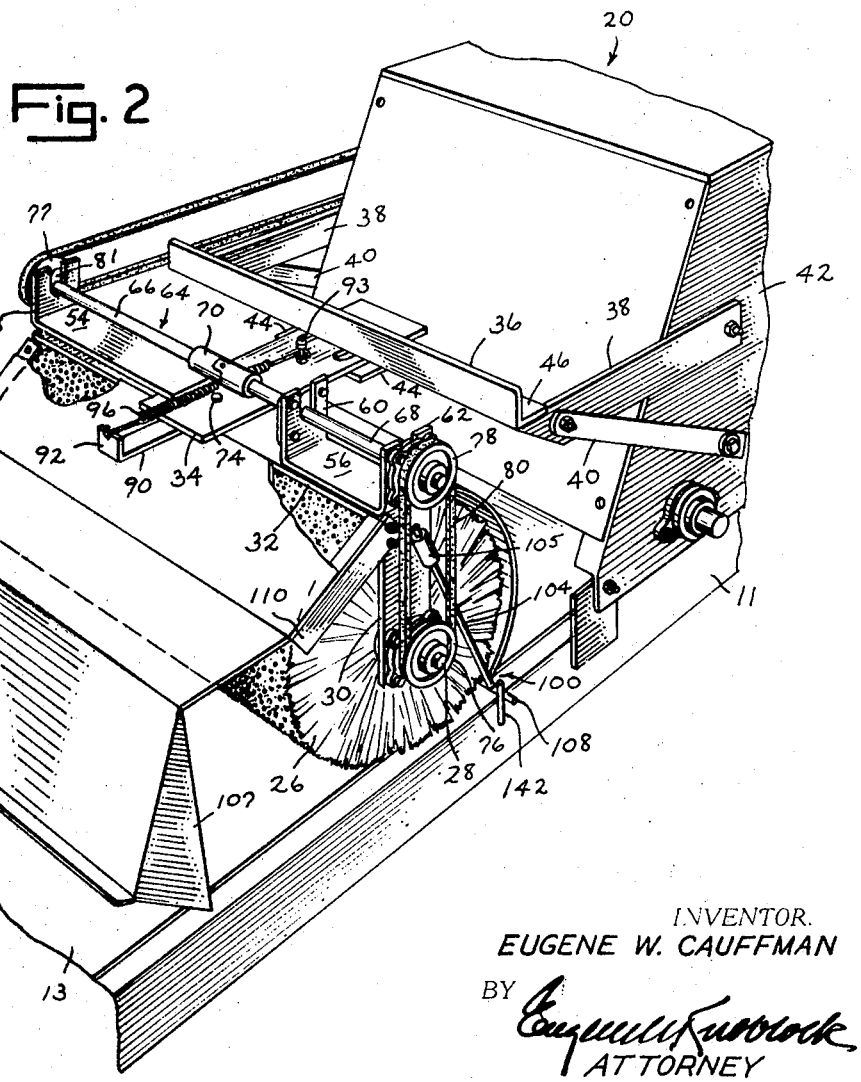
INVENTOR.
EUGENE W. CAUFFMAN
BY
ATTORNEY

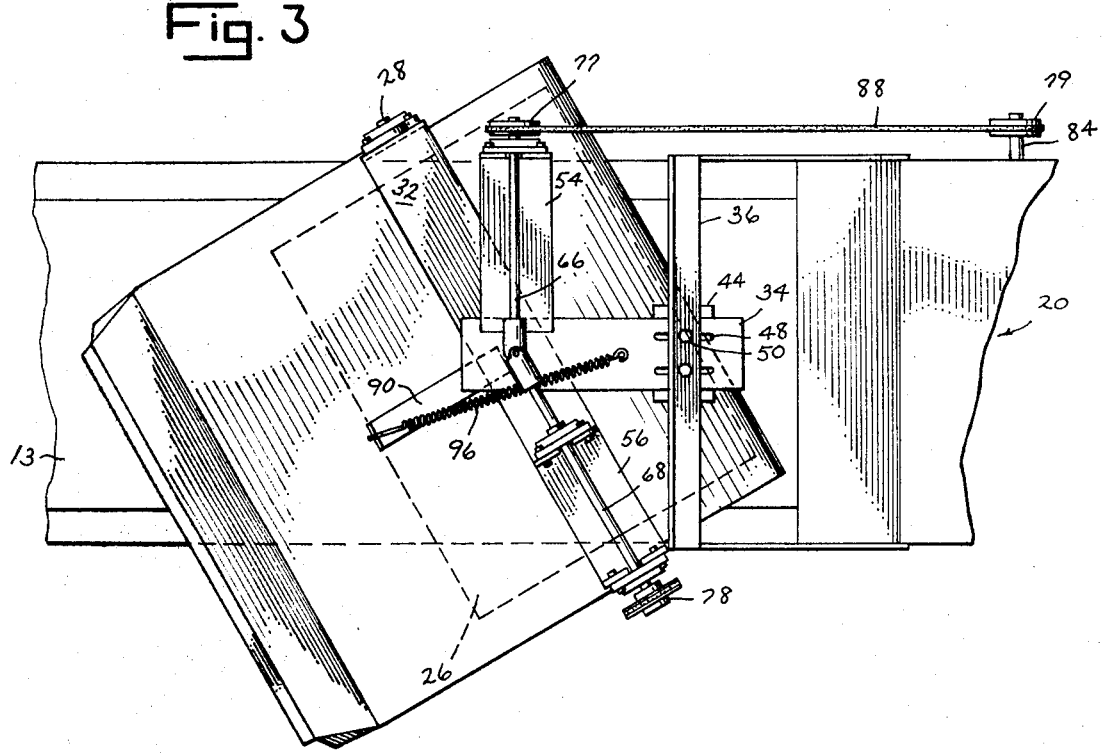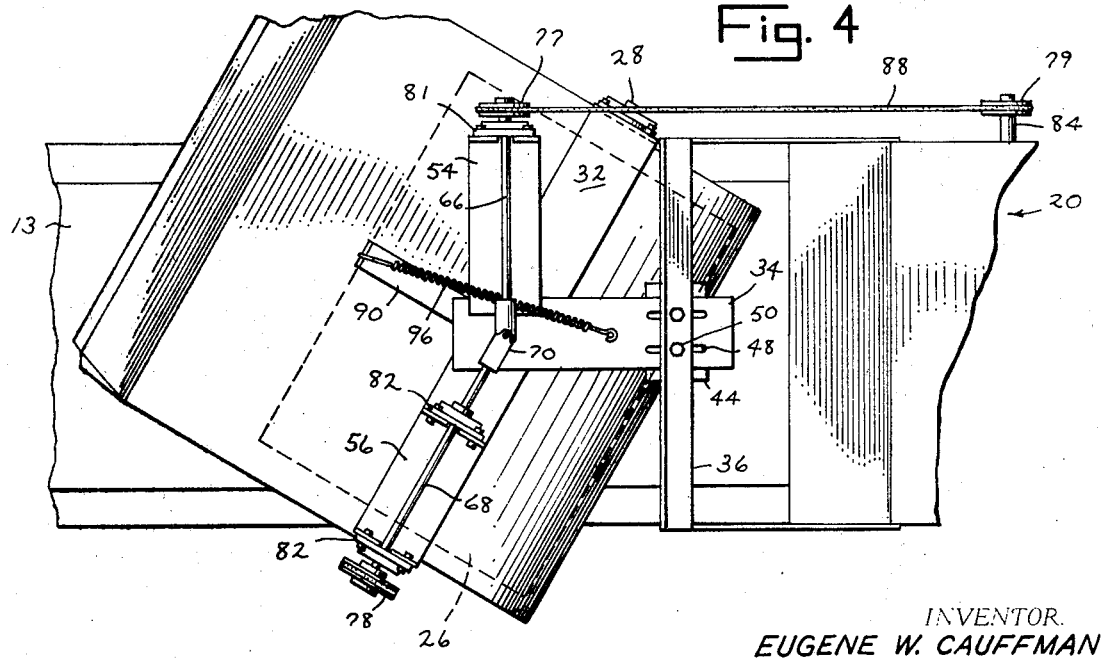

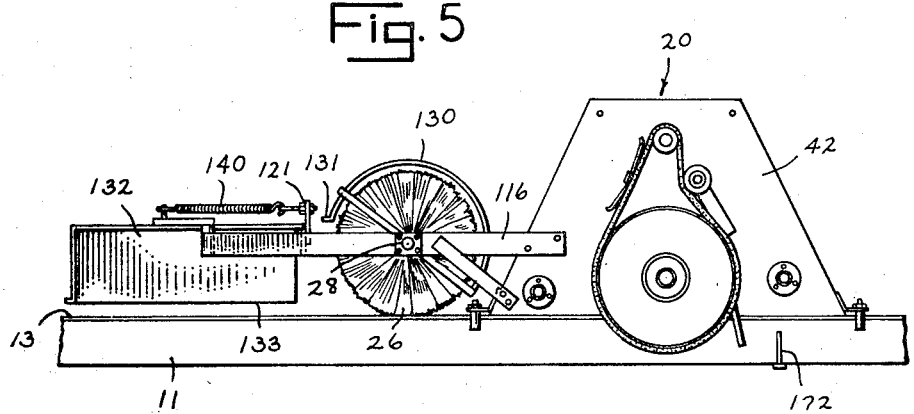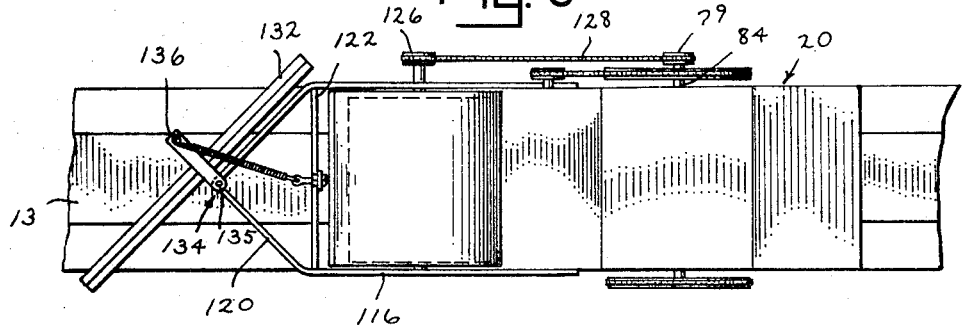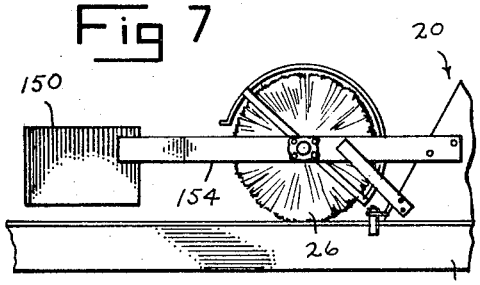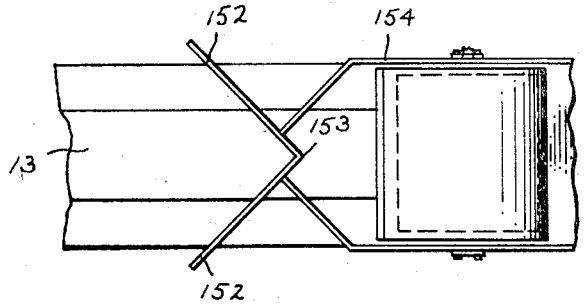

United States Patent Office 3,520,397
Patented July 14, 1970

3,520,397
PARTICULATE MATERIAL DISTRIBUTING DEVICE
Eugene W. Cauffman, Claypool, Ind., assignor to Supreme Augers, Inc., Silver Lake, Ind.
Filed Apr. 15, 1968, Ser. No. 721,264
Int. Cl. B65g 15/00
U.S. Cl. 198—185         14 Claims

ABSTRACT OF THE DISCLOSURE

A particulate material distributing device having a brush rotatively mounted on a carrier which reciprocates along an elongated table supporting the upper run of a power driven conveyor belt adapted to carry granular material from a supply source to a delivery zone. The brush is so positioned that its bristles engage the upper run of the conveyor belt to sweep said material from the belt.

BACKGROUND OF THE INVENTION

This invention pertains to an improved particulate material distributing device, and more particularly to a device useful for distributing animal feed to feed bunks and troughs.

Feed material distributing devices such as those described in my co-pending application, Ser. No. 624,396, filed Mar. 20, 1967, now U.S. Pat. No. 3,437,192, and in U.S. Pat. No. 3,306,261 utilize a power driven conveyor belt to carry feed material along an elongated support. The material is deflected laterally from the belt into a feed bunk or trough alongside the support by a member which travels along the support between spaced limit points.

The feed material may constitute various mixtures of forage, such as hay, corn silage, oats and other grasses, to which may be added other foodstuff, such as peanut hulls, ground candy, grain sorghum, sugar beet pulp and cookie crumbs. Such feed mixtures have a tendency to become tacky and thus adhere to the belt, necessitating the cleaning of the belt by the removal of the adhering feed deposit. Heretofore, removal of this feed deposit has been attempted by the use of scrapers which also customarily serve as the means for deflecting the feed material into adjacent feed troughs. It is been found that the action of the scrapers is injurious to the surface of the belt and that the adhering feed deposit is not satisfactorily removed.

SUMMARY OF THE INVENTION

This invention relates to a particulate material distributing device which includes an elongated table, a power driven conveyor belt having its upper run traversing the top of said table, a carrier reciprocable on said table between spaced limit positions, and a discharge means for discharging material from said upper belt run as the belt traverses said table. A rotatable brush is mounted on said carrier and has its bristles engaging the upper belt run. Means are included for rotating said brush to cause the belt-carried material to be swept from the belt by the brush and for directing the swept material to a discharge or receiving bunk or trough.

In this invention the brush effectively serves to remove any material adhering to the conveyor belt. The brush may also serve, either by itself or in combination with a deflector, as a means for causing the material to be swept from the conveyor belt in desired direction into a feed container or trough positioned to the side of the distributor table.

Accordingly, it is an object of this invention to provide a material distributing device having an effective mechanism for removing adhering deposits from a conveyor belt.

It is also an object of this invention to provide a material distributing device in which material carried by a conveyor belt is swept from the belt in selected direction by a rotating brush.

It is a further object of this invention to provide a feed material distributing device in which feed material carried by a conveyor belt is evenly deposited into feed troughs positioned on both sides of the belt.

A further object is to provide a device of this character with shiftable means for rotatably supporting a brush and with novel means for rotating the brush in all positions thereof.

A further object is to provide a device of this character with a power driven brush mounted on a support shiftable between two different operating positions under the control of means for maintaining a selected operating position and means for reversing operating positions.

Other objects of this invention will become apparent upon a reading of the invention's description.

BRIEF DESCRIPTION OF THE DRAWINGS

FIG. 1 is a fragmentary view in side elevation of one embodiment of the material distributing device of this invention.

FIG. 2 is an enlarged detail perspective view of a brush mounting, positioning and driving unit of the device of FIG. 1.

FIG. 3 is a top plan view of the device of FIG. 1 showing the brush in one operative relation to the conveyor belt.

FIG. 4 is a top plan view of the device of FIG. 1 showing the brush in a different operative relation to the conveyor belt.

FIG. 5 is a fragmentary side view of another embodiment of this invention.

FIG. 6 is a top plan view of the device shown in FIG. 5.

FIG. 7 is a fragmentary side view of a modification of the device shown in FIG. 5.

FIG. 8 is a top plan view of the device shown in FIG. 7.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and their application and practical use to thereby enable others skilled in the art to best utilize the invention.

One embodiment of this invention used as an animal feeding device is shown in FIG. 1 and includes a frame 10 supporting an elongated horizontal table 11 having a top. An endless conveyor is carried by frame 10 and includes a belt 12 having an upper run 13 which traverses the top of the table 11. The conveyor belt is power driven by any suitable conveyor drive means 14 and preferably travels at a constant lineal speed. A feed hopper 16 which serves to deposit a metered amount of feed material or mixture onto the upper run 13 of conveyor belt 12 is located at one end of table 11. A feed storage bin 18 may overlie feed hopper 16. A feed trough, bunk or container 22 is positioned alongside the frame 10 adjacent each side of table 11.

A carrier 20 overlies table 11 and is supported to reciprocate between spaced limit positions along the top of the table. The manner in which carrier 20 is supported and is caused to reciprocate along table 11 may vary. As one example, the conveyor belt 12 may be trained over a series of rollers journaled within carrier 20. These rollers may in turn drive a friction wheel engaging the top surface of table 11 and controlled by reversing means. A drive of this type is described in my co-pending application, Ser. No. 624,396, filed Mar. 20, 1967. Another means of carrier drive may involve the use of a reversible drive motor mounted within or otherwise operatively connected to the carrier 20 and independent or separate from the belt driving means.

A feed material distributor 15 is mounted on carrier 20 and includes a rotatable brush 26 engaging the upper run 13 of conveyor belt 12 as shown in FIGS. 2–4. Brush 26, preferably having bristles formed of nylon or other synthetic resin type material and cylindrical in configuration, is mounted upon an axial shaft 28 which has its end portions journaled in side plates 30 (only one shown) of a brush frame. Side plates 30 terminate above the outline of brush 26 and may be interconnected at their upper terminal portions by a horizontal cross member 32. Cross member 32 of the brush frame is pivotally connected at a point adjacent the midlength point of brush 26, i.e. midwidth of the table, to a longitudinal support member 24 which projects from the carrier 20. The brush frame pivot may constitute a headed pin 74 journaled in an aperture in support member 34 and having its end anchored or press fit into an underlying registering aperture in cross member 32. To facilitate pivotal movement between cross member 32 and support member 34, one of said members be coated with tetrafluoroethylene about the area of engagement of said members.

Support member 34 may be mounted on the carrier 20 in any desired manner. Thus a channel member 36 may be mounted forwardly of and supported by carrier 20 by means of horizontal braces 38 and inclined braces 40 each of which has one end secured to an end of channel member 36 and the other end secured to a side panel 42 of carrier 20. Side guide plates 44 are secured to the bottom web 46 of channel member 36. Longitudinal support member 34 is secured to cross member 36 of the brush frame between guide plates 44, as by means of bolts 50 which extend through elongated adjustment slots 48 in support 34 and are secured therein by engaging nuts (not shown). A bracket 54 is fixedly secured to the support member 34 and extends laterally from pivot pin 73 and terminates in an upstanding flange 58 which preferably lies in substantially the same vertical plane as the adjacent carrier side panel 42. Flange 58 mounts a bearing member 81. A second bracket 56, here shown as U-shaped, is preferably aligned with and secured to cross member 32 of the brush frame as shown in FIG. 2. Bracket 56 may include upwardly projecting flanges 60 and 62 each of which mount a bearing member 82.

A horizontal articulated shaft 64 having parts 66 and 68 joined by a universal joint 70 is carried by bearing members 81 and 82. Universal joint 70 is positioned with its pivotal center substantially at a vertical projection of the axis of pivot pin 73. Shaft part 66 is journaled in bearing member 81 and shaft part 68 is journaled in the spaced bearing members 82. A pulley 78 is secured to the outer end portion of shaft 64 extending beyond flange 62 of bracket 56. A pulley 76 is secured to the projecting end of brush shaft 28 and lies in substantially the same vertical plane as pulley 78. An endless belt 80 is trained about pulleys 76 and 78. A pulley 77 is secured to the end portion of shaft part 66 extending beyond flange 58 of bracket 54. An arm 90 terminating in an upwardly projecting flange 92 is carried by and projects forwardly from the central part of the cross member 32 of the brush frame. An anchor 93 is mounted upon longitudinal support 34 to the rear of and in substantial longitudinal alignment with pivot pin 73. A tensioned coil spring 96 has one end attached to flange 92 of arm 90 and its other end attached to anchor 93.

A pulley 79 is secured to the extended end portion of a horizontal shaft 84 which is carried by and extends laterally through a carrier side panel 42 into carrier 20. Pulley 79 lies in substantially the same vertical plane as pulley 77. An endless belt 88 is trained about pulleys 77 and 79. The shaft 84 may be connected to any drive means, such as an independent motor means (not shown) mounted within carrier 20 or a roller (not shown) over which the conveyor belt 12 is trained as described in my co-pending application, Ser. No. 624,396, filed Mar. 20. 1967. Although the drive for shaft 84 may be of variable speed, it is preferable that said shaft be driven at a constant speed.

A curved cover 98 is preferably mounted on the brush frame to arch over brush 26. Cover 98 has a transverse lower edge 100 which is positioned between the brush 26 and the carrier 20 and preferably below the level of brush shaft 28. Edge 100 is mounted to a lateral support rod 108 having one end extending beyond the outline of table 11. Rod 108 is positioned by means of two diagonal supports 104 (only one shown), each of which has one end secured to a holder 105 on a side plate 30 and the other end secured to rod 108. Cover 98 preferably extends around brush 26 with clearance and in selected spaced relation to the peripheral configuration of the brush. The end of cover 98 opposite its edge 100 is preferably positioned approximately at the level of brush shaft 28 and preferably is configured to provide an integral outturned flange 102 and a terminal depending flange 103. Flange 103 may serve as a deflector for the feed material particles swept into it by the rotation of brush 26. The terminal edge part 105 of flange 103 is preferably spaced above the level of the deposited feed material carried by belt 12. Flange 103 may have angled side parts 107. Cover 98 is further supported by inclined braces 110 (only one shown). Each brace 110 is secured at one end to a side plate 30 and along its uppermost inclined longitudinal edge to a marginal side edge of the cover adjacent cover flange 102.

In operation, conveyor belt 12 is driven by conveyor drive 14 at substantially constant lineal speed, with feed hopper 16 depositing a continuously metered amount of feed material upon the upper run 13 of belt 12. Carrier 20 is caused to reciprocate between selected limit positions along table 11. The shaft 84 of the carrier 20 rotates to drive belt 88, shaft 64 and belt 80 to cause rotation of brush 26.

As conveyor 20 proceeds in one direction along table 11, brush 26 and its supporting structure is positioned to extend diagonally with respect to the upper run 13 of conveyor belt 12, thus sweeping feed material from the belt laterally into a feed trough 22 at one side of the device. This position is best illustrated in FIG. 3, with the brush axis being positioned from 60° to 70° relative to the path of travel of the belt. The brush is urged to this orientation or position by coil spring 96 which is positioned over center relative to pivot pin 73, causing cross member 32 or some other part of the brush frame to engage a stop, such as the extended end of channel member 36 of the carrier 20. As carrier 20 approaches one end of its run or path of travel, support rod 108 of cover 98 engages a trip 142 mounted at a selected position along one side of table 11, thereby causing the brush frame and brush 26 to be pivoted about pin 73 from the position illustrated in FIG. 3 to the position illustrated in FIG. 4. During the pivoting of the brush frame, coil spring 96 passes over center relative to pivot pin 73 and acts as a quick-throw device causing cross member 32 or a part of the brush frame to engage a second stop, such as the opposite end of cross channel 32 of carrier 20. The brush pivot means is so correlated to the direction controlling means of the carrier 20 that reversal of the direction of travel of carrier 20 occurs substantially simultaneously with reversal of the angular position of the brush. Carrier 20 then proceeds along table 11 with brush 26 sweeping feed material laterally from the belt 12 into the feed trough 22 at the side of table 11 opposite that receiving feed during the immediately preceding run of the carrier 20. When carrier 20 reaches the limit of travel opposite of that first described and is reversed in direction, the extended end of support rod 108 engages another trip 142 on the table, causing brush 26 to be swung to its position illustrated in FIG. 3.

By means of universal joint 70, the brush 26 rotates at the same speed in both of the opposite angular positions illustrated in FIGS. 3 and 4. While the angular position of brush 26 relative to the path of travel of conveyor 12 may vary from 60° to 70°, it is preferable that the brush's angular position be approximately 60° to assure that the feed material is swept laterally to only one side of belt 12 and table 11 during each run of carrier 20.

Carrier 20 preferably moves along table 11 at one speed in one direction and at a different speed in the opposite direction. By so controlling the lineal speed of carrier 20 while maintaining substantially constant the speeds of brush rotation and belt travel, the relative motion between upper run 13 of belt 12 and the peripheral speed of the tips of the bristles of brush 26 can be substantially equalized during both of the opposite runs of the carrier 20 along table 11. In this manner, substantially the same amount of feed material subjected to substantially the same brush displacing force will be deposited in each of the two opposite feed troughs 22. If desired, the lineal speed of belt 12 and the rotational speed of brush 26 may be varied by suitable means (not shown) while the speed of travel of carrier 20 remains constant to produce substantially equal relative motion between belt 12 and brush 26 for equal discharge of material into the troughs at opposite sides of the table 11. The feed material is swept from the upper run 13 of the conveyor belt 12 by the whipping action of the brush bristles which are flexed as they engage the upper surface of the belt run.

A modification of the particulate material distributor is shown in FIGS. 5 and 6. Brush 26 is mounted adjacent to a carrier 20, having its shaft 28 journaled at opposite points of laterally spaced longitudinal supports 116 projecting from the carrier. Supports 116 may each have one end portion thereof secured to a side panel 42 of carrier 20 and extend beyond brush 28 and terminate in converging portions 120. The forward ends of converging portions 120 are joined at 134. A cross support member 122 may be mounted between longitudinal supports 116. A pulley 126 is secured to one end of brush shaft 28. An endless belt 128 is trained about pulley 126 and a pulley 79 is secured to a carrier driven shaft 84 whose function and structure is similar to that previously described. A cover 130 of construction and configuration similar to cover 98 which was previously described is positioned with clearance over brush 26 and preferably terminates at its outermost end, shown at the left in FIG. 5, above the level of brush shaft 28 in a transverse narrow substantially horizontal flange 131.

A substantially vertical deflector plate 132 is pivotally mounted at 134 adjacent its center and midwidth of table 11 to the converging connected portion 120 of supports 116 by means of a pin 135. The lower edge 134 of deflector plate 32 is preferably spaced above the upper run 13 of a conveyor belt so as to clear the level of feed material carried upon the belt. An arm 136 projects outwardly from the center of the distributor plate 132. A tensioned coil spring 140 is secured at one end to the free end of arm 136 and is secured at its other end to an anchor part 121 located substantially centrally on the cross support 122. Suitable stop means (not shown) limit the angular displacement of the deflector. Trip members 172 (only one shown) are mounted one to each side at opposite ends of table 11 and are adapted to engage the leading portion of the angularly disposed deflector plate 132 to reverse the angular position of the deflector at the end of each stroke or path of travel of the carrier 20.

During travel of carrier 20, brush 26 and deflector 132 along table 11, feed material carried by conveyor belt 12 is swept by brush 26 against the deflector plate 132 and into a feed trough 22. The angle the deflector plate makes with respect to belt 12 determines the lateral direction in which the feed material is deflected, i.e. determines which of two opposed feed troughs 22 receives the feed material. As carrier 20 approaches a limit position along table 11, deflector plate 132 engages a trip member 172 causing said plate to be pivoted into an opposite angular position by the over center quick-throw action of spring 140. During the next run of carrier 20 in reverse direction along table 11, feed material swept by brush 26 will be deflected by the deflector plate 132 into the feed trough 22 at the side of the table 11 opposite that receiving the material during the preceding run. The rotative speed of brush 26 and the speed of travel of belt 12 are preferably constant during the traverse of carrier 20 in both directions.

Another embodiment of a particulate material distributor is shown in FIGS. 7 and 8. In this construction a brush 26 is journaled and positioned relative to a carrier 20 as described in the modification shown in FIGS. 5 and 6. The device includes a deflector plate 150 of V-shaped configuration having sides 152 joined at an upright edge 153. Deflector plate 150 is fixedly mounted at the outer part of brush support frame 154 which projects from the carrier 20 with edge 153 located adjacent the center line of belt 12 and with sides 152 forwardly diverging from brush 26. In this modification, feed material swept by rotating brush 26 is deflected laterally by deflector plate 150 into feed troughs 22 at both sides of the device as carrier 20 reciprocates along table 11.

It will be understood that the invention herein described is not to be limited to the details herein given but may be modified within the scope of the appended claims.

What I claim is:

1. In a particulate material distributing device including an elongated table, power driven conveyor belt having an upper run traversing said table, a carrier reciprocable along said table between spaced limit positions and supply means for depositing particulate material upon said upper belt run as it traverses said table, the improvement comprising a rotatable brush carried by said carrier and having its bristles engaging said upper belt run, and means carried by said carrier for rotating said brush to cause said particulate material to be swept from said belt by said brush.

2. The material distributing device of claim 1, and means controlling the relative rates of speed of said belt, said brush and said carrier to discharge particulate material at substantially the same rate during travel of said carrier along said table in opposite directions.

3. The material distributing device of claim 1, wherein said brush rotates about a horizontal axis and is swingable between oppositely angularly displaced positions relative to said upper belt run, and means to swing said brush from one angular position to the opposite angular position as each carrier limit position is reached.

4. The material distributing device of claim 3, and means for rotating said brush at substantially constant speed.

5. The material distributing device of claim 1, and means for directing the swept particulate material in selected lateral direction from said conveyor belt.

6. The material distributing device of claim 5, wherein said brush is journaled in a support frame pivotally mounted to said carrier on a substantially vertical axis, said directing means including a quick-throw means connecting said support frame and carrier and urging said brush to one of two positions oppositely angularly displaced relative to said upper belt run, a trip member on said table engageable with said support frame and positioned adjacent each carrier limit position to cause the swinging of said brush and shifting of said quick-throw means.

7. The material distributing device of claim 5, wherein said brush rotation means includes a shaft having first and second parts connected by a universal joint, said shaft first part being carried by said support frame and operatively connected to said brush for imparting rotary motion to said brush, said shaft second part being carried by said carrier and operatively connected to a power drive source on said carrier, said universal joint having its pivotal axis substantially vertically aligned with the pivotal axis of said support frame.

8. The material distributing device of claim 5, wherein said particulate material directing means includes a deflector mounted on said carrier over said upper belt run and in the path of the brush-directed particulate material discharge.

9. The material distributing device of claim 5, wherein said brush rotates about a horizontal axis and is positioned transversely to said upper belt run, and said particulate material directing means includes a deflector carried by said carrier and positioned adjacent said brush, said deflector being pivoted on a substantially vertical axis and swingable between opposite angularly displaced relations to said upper belt run.

10. The material distributing device of claim 9, wherein said particulate material directing means includes a member responsive to the location of said carrier at selected points along said table for causing said deflector to swing from one angular discharge position to an opposite angular discharge position.

11. The material distributing device of claim 5, wherein said brush rotates about a horizontal axis and is positioned transversely to said upper belt run, and said particulate material directing means includes a deflector projecting from said carrier and mounted adjacent said brush, said deflector having angularly displaced parts diverting from a central part and extending to an adjecent edge of said table.

12. The material distributing device of claim 1 and including means carried by said carrier causing said brush to sweep said particulate material in selected lateral direction from said belt.

13. The material distributing device of claim 1 wherein said brush rotating means includes a friction driven member engaging said belt and being operatively connected to said brush for imparting rotational movement thereto.

14. The material distributing device of claim 13 wherein said friction driven member is a roller and engages the upper run of said belt.

References Cited

UNITED STATES PATENTS

| | | | |
|---|---|---|---|
| 2,314,344 | 3/1943 | Cornell | 119—21 |
| 2,462,272 | 2/1949 | Mueller | 198—185 |
| 3,306,261 | 2/1967 | Purdy | 119—56 |
| 3,437,192 | 4/1969 | Cauffman | 198—188 |

RICHARD E. AEGERTER, Primary Examiner